United States Patent [19]

Griffiths

[11] Patent Number: 4,625,451
[45] Date of Patent: Dec. 2, 1986

[54] LIVE BAIT HOLDER FOR SURFACE FISHING

[76] Inventor: James S. Griffiths, 2947 NW. 8th Ave., Ontario, Oreg. 97914

[21] Appl. No.: 773,791

[22] Filed: Sep. 9, 1985

[51] Int. Cl.$^4$ .............................................. A01K 83/06
[52] U.S. Cl. ..................................... 43/44.4; 43/44.2; 43/44.6; 43/44.8
[58] Field of Search ................. 43/44.4, 44.2, 44.6, 43/44.8

[56] References Cited

U.S. PATENT DOCUMENTS

| | | | |
|---|---|---|---|
| 2,736,123 | 2/1956 | Peterson | 43/42.09 |
| 3,105,319 | 10/1963 | Whalen | 43/44.4 |
| 3,156,066 | 11/1964 | Munyer | 43/44.4 |
| 3,415,004 | 12/1968 | Whalen | 213/44.4 |
| 3,760,526 | 9/1973 | Hicks | 43/44.4 |
| 3,893,255 | 7/1975 | Hicks | 43/44.4 |
| 4,233,771 | 11/1980 | Robinson | 43/44.4 |

FOREIGN PATENT DOCUMENTS 2509133  1/1983  France ................. 43/44.4

Primary Examiner—Nicholas P. Godici
Assistant Examiner—Karen Skillman
Attorney, Agent, or Firm—Paul F. Horton

[57] ABSTRACT

A live bait holder for surface fishing, said holder ring-shaped in form and defining an orifice for holding live bait such as grasshoppers, crickets, and the like. The ring is constructed of resilient material and has a cut therethrough for deformation of the ring for placement of the bait. The holder preferably includes at least two barbs, inwardly projecting into the orifice for engaging and securing the bait and includes a tab made of permeable material for insertion and containment of a fishhook.

3 Claims, 3 Drawing Figures

LIVE BAIT HOLDER FOR SURFACE FISHING

BACKGROUND OF THE INVENTION

1. Field of the Invention

This invention relates, in general, to holders of live bait for fishing and more particularly to a device for holding live grasshoppers, crickets, and the like, for surface fishing.

2. Description of the Prior Art

For the catching of game fish by line fishing, it is generally accepted that live bait is most desirable, probably due to the activity created by the bait. Live bait holders are known for holding minnows as typified by U.S. Pat. No. 3,893,225 issued to J. W. Hicks and U.S. Pat. No. 4,233,771 issued J. G. S. Robinson; shrimp as shown by U.S. Pat. No. 3,760,526 issued to J. W. Hicks; and for grasshoppers, as shown by U.S. Pat. No. 2,727,330 issued to M. J. Huff. Problems with live bait holders already in the art are due to their complexity, making manufacture and sale not cost efficient; difficulty in the placement of the bait within the holder; the requirement of the holder being integral with or affixed to the hook, preventing choice of hooks with a particular holder and preventing placement of hook relative to the holder; nonuse of a buoyant material, highly desirable for surface fishing; and the bulkiness of the holders causing inconvenience in both the packaging and portability of the holder for use.

SUMMARY OF THE INVENTION

The present invention overcomes these problems of the prior art by providing a live bait holder for surface fishing which comprises a split ring of resilient material, said ring being provided with one or more barbs projecting inwardly into the orifice defined by the ring; said ring also being provided with a permeable tab for reception of a selected fish hook; and said ring being constructed of buoyant material. A more detailed description may be found in the appended claims.

It is therefore a primary object of the present invention to provide a holder for live bait which is inexpensive and simple, yet highly effective for holding live bait such as grasshoppers.

It is also an object of the present invention to provide a live bait holder which defines an enclosure but is readily deformable for the convenient insertion of bait.

Another object of the present invention is to provide a live bait holder having one or more barbs inwardly depending from a ring-shaped body for securement of the bait.

Still another object of the present invention is to provide a live bait holder which is permeable to a fish hook for selection as to hook type and hook placement.

A further object of the present invention is to provide a live bait holder which is constructed of buoyant material for surface fishing.

These and other advantages will become apparent and a more thorough and comprehensive understanding may be had from the following description taken in conjunction with the accompanying drawings forming a part of this specification.

DETAILED DESCRIPTION OF THE INVENTION

Figure 1:
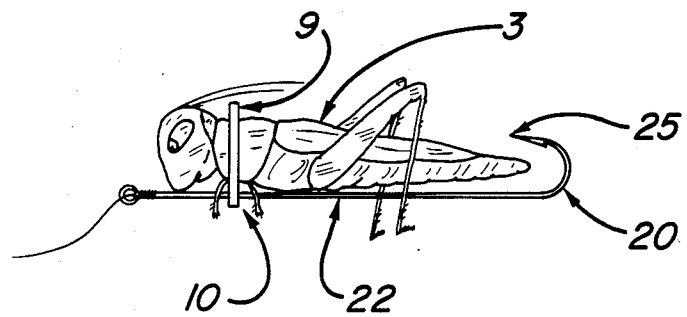
FIG. 1 is a side elevation of the live bait holder of the present invention shown holding a grasshopper with a fish hook mounted.
Figure 2:
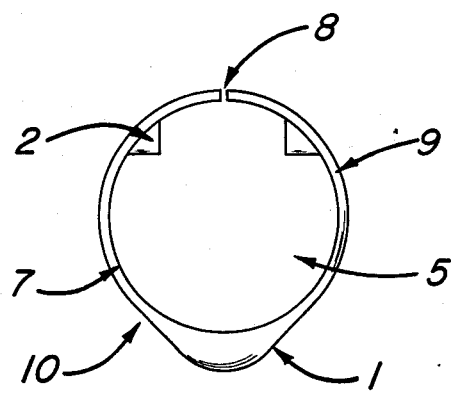
FIG. 2 is a front view of the holder.

Referring now to the drawings, an embodiment to be preferred of a live bait holder, designated generally by the numeral 10, made according to the present invention is disclosed. Bait holder 10 is in the form of a ring 9 which defines an enclosure or orifice 5 into which the bait 3 is inserted. Ring 9 is split to define a cut or partition 8 and is constructed of a resilient material such as polyethylene, polyethylene-nylon laminate, or the like, so the ring may be manually separated for insertion of the bait. It is highly preferable that the construction material have an overall density less than water so as to be buoyant for surface fishing. It is also important that the ring either be made of a material which is permeable or, as is preferable, include a tab 1 which is permeable to the insertion of a fishhook 20 for receiving and holding the shaft 22 of the fishhook therein. While the lateral thickness of the wall may be made wide enough to accommodate the shaft of a fishhook, for structural integrity and for movement through the water, it is preferred that the wall of the ring be thin and that tab 1 be provided. The tab may project outwardly from the ring, as is shown, or may project inwardly into orifice 5.

Inwardly projecting into orifice 5 from the interior surface 7 of the ring are one or more barbs 2 which are operable to engage bait 3 to secure the bait within orifice 5 of the ring. Barbs 2 are preferably integral with the material defining the interior surface of the ring and preferably are pointed for firm contact with the bait. Exclusive of the tab 1 and barbs 2, the ring may be circular in cross-section.

Figure 3:
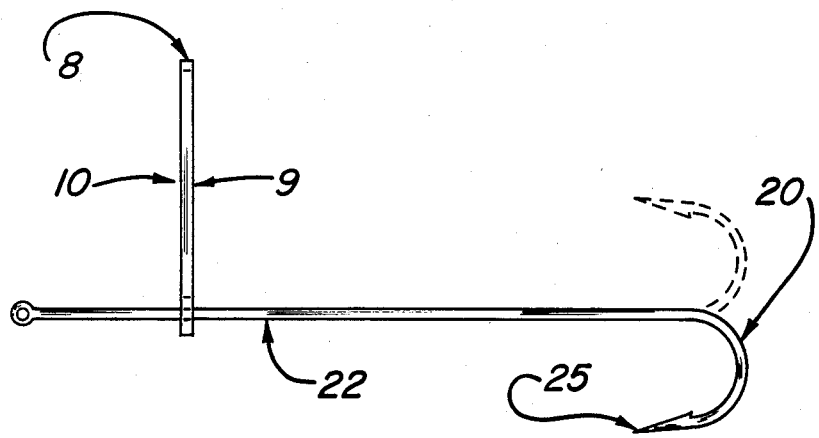
FIG. 3 is a side view of the holder showing fish hook placement.

For use, a fishhook is first mounted on holder 10 by penetrating the permeable material of either tab 1 or the wall of ring 9 with the point 25 of hook 20, and threading the hook into the opening created thereby until shaft 22 of the hook is within the opening. The hook may then be moved a selected distance longitudinally in either direction. Placement of the bait as to forward or rearward position is optional, as is the rotational placement of the hook itself, shown in a second placement by the dotted lines of FIG. 3. It is to be further noted that the size and type of hook are also optional. After mounting of the hook, the ring is then separated and distorted by pulling the ring apart at cut 8 a selected distance for insertion and placement of the bait, as for example a grasshopper. Because cut 8 may be separated, it is to be noted that there is no need to attempt to force the bait longitudinally through the orifice and there is therefore no mutilation of the bait. Also, because of the longitudinal thinness of the ring, the bait is unencumbered as to the use of legs for movement. The resiliency of the ring allows the ring to tightly encircle the bait with barbs 2 securely engaging the bait.

Having thus described in detail a preferred embodiment of the present invention, it is to be appreciated and will be apparent to those skilled in the art that other physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the mean- ing and range of equivalency of the claims are therefore to be embraced therein.

I claim:

1. A live bait holder comprising:
a ring defining an orifice for receiving live bait, said ring constructed of a resilient material and having a narrow slit therethrough for the separation of the ring for insertion of live bait into the orifice and the retraction thereof to substantially encircle the bait for confinement of the bait, said ring constructed of a material having a density less than water for flotation, and said ring provided with a permeable tab located diametrically opposite of said slit and having a hook attached to said ring by penetration of said permeable tab so that the shank of said hook is longitudinally parallel to said orifice.

2. The holder as described in claim 1 wherein said ring is provided with at least two inwardly projecting barbs for engaging and securing said bait within the orifice.

3. The holder as described in claim 1 wherein said ring is substantially circular in cross-section.

* * * * *